(12) United States Patent
Bocking et al.

(10) Patent No.: US 8,869,143 B2
(45) Date of Patent: *Oct. 21, 2014

(54) METHOD AND SYSTEM FOR SELECTING A PROGRAM FOR DOWNLOAD

(75) Inventors: Andrew Douglas Bocking, Conestogo (CA); Timothy Richard Tyhurst, Kitchener (CA)

(73) Assignee: BlackBerry Limited, Waterloo (CA)

( * ) Notice: Subject to any disclaimer, the term of this patent is extended or adjusted under 35 U.S.C. 154(b) by 280 days.

This patent is subject to a terminal disclaimer.

(21) Appl. No.: 13/548,355

(22) Filed: Jul. 13, 2012

(65) Prior Publication Data

US 2012/0284705 A1 Nov. 8, 2012

Related U.S. Application Data

(63) Continuation of application No. 10/786,823, filed on Feb. 25, 2004, now Pat. No. 8,239,858.

(51) Int. Cl.
*G06F 9/445* (2006.01)
(52) U.S. Cl.
CPC ........................................ *G06F 8/60* (2013.01)
USPC ............ 717/178; 717/174; 717/176; 717/177
(58) Field of Classification Search
CPC ........................................................ G06F 8/60
USPC ................................................. 717/168–178
See application file for complete search history.

(56) References Cited

U.S. PATENT DOCUMENTS

| 5,809,251 | A | 9/1998 | May et al. |
| 5,845,090 | A | 12/1998 | Collins et al. |
| 5,860,012 | A | 1/1999 | Luu |
| 5,901,320 | A | 5/1999 | Takahashi et al. |
| 6,067,582 | A | 5/2000 | Smith et al. |
| 6,151,643 | A | 11/2000 | Cheng et al. |
| 6,189,146 | B1 | 2/2001 | Misra et al. |
| 6,452,588 | B2 | 9/2002 | Griffin et al. |

(Continued)

FOREIGN PATENT DOCUMENTS

WO 02/067483 A2 8/2002

OTHER PUBLICATIONS

Palmone, Inc., "Handspring: Customer Support—Find answers", http://support.handspring.com/esupport/forms/hsResolutionVew.jsp?ResolutionID=8332&1stProducts=4413, Oct. 17, 2003, 2 pp.

(Continued)

*Primary Examiner* — Qing Chen
(74) *Attorney, Agent, or Firm* — Ridout & Maybee LLP

(57) ABSTRACT

A system selects an application program for download. The system includes a host system, such as a personal computer, having a disk sub-system storing a plurality of application programs. The disk sub-system includes a file storing a plurality of identifiers, with each of at least some of the identifiers being associated with one or more of the application programs. A target system, such as a wireless handheld electronic device, includes a hardware identifier and a vendor identifier. A communications channel connects the host system and the target system. An application loader routine executes at the host system, communicates with the target system through the communications channel, requests the hardware and vendor identifiers as a received identifier from the target system over the communication channel, and employs the identifiers and the received identifier to select one of the application programs for download from the host system to the target system.

20 Claims, 5 Drawing Sheets

(56) References Cited

U.S. PATENT DOCUMENTS

| | | |
|---|---|---|
| 6,489,950 B1 | 12/2002 | Griffin et al. |
| 6,496,979 B1 | 12/2002 | Chen et al. |
| 6,701,521 B1 | 3/2004 | McLlroy et al. |
| 6,944,859 B2 | 9/2005 | Bunger |
| 7,062,765 B1 | 6/2006 | Pitzel et al. |
| 7,779,408 B1 * | 8/2010 | Papineau .................... 717/178 |
| 2002/0010652 A1 | 1/2002 | Deguchi |
| 2002/0092014 A1 | 7/2002 | Shibusawa et al. |
| 2003/0018825 A1 | 1/2003 | Johnson, Jr. et al. |
| 2003/0041125 A1 | 2/2003 | Salomon |
| 2003/0056207 A1 | 3/2003 | Fischer et al. |
| 2003/0066066 A1 | 4/2003 | Nguyen et al. |
| 2003/0135668 A1 | 7/2003 | Abe |
| 2004/0088700 A1 | 5/2004 | Lee et al. |
| 2004/0093595 A1 | 5/2004 | Bilange |
| 2004/0133887 A1 | 7/2004 | Herle et al. |
| 2004/0194081 A1 | 9/2004 | Qumei et al. |
| 2005/0022182 A1 | 1/2005 | Mittal |

OTHER PUBLICATIONS

Orange Personal Communications Services Ltd., "Orange.com—SPV update", http://www.orange.com/English/forwardthinking/spvupdate.asp?bhcp=1, Oct. 17, 2003, 1 p.

Infosync AS, "InfoSync World: Treo 600 Sprint update out", http://www.infosyncworld.com/news/n/4540.html, Jan. 29, 2004, 3 pp.

Research in Motion Limited, "Deploying BlackBerry Desktop and Handheld Software", XP-002286590, about Apr. 2003, 2 pages and pp. 1-8.

Elmagarmid et al., "Wireless Client/Server Computing for Personal Information Services and Applications", 1995, ACM, pp. 16-27.

Lewandowski, Scott M., "Frameworks for Component-Based Client/Server Computing", 1998, ACM, p. 3-27.

Jing et al., "Client-Server Computing in Mobile Environments", 1999, ACM, p. 117-157.

European Search Report on European Patent Application No. EP04251044 dated Oct. 21, 2004; 10 pages.

* cited by examiner

METHOD AND SYSTEM FOR SELECTING A PROGRAM FOR DOWNLOAD

This application is a continuation of U.S. patent application Ser. No. 10/786,823 filed Feb. 25, 2004 (now U.S. Pat. No. 8,239,858) entitled "METHOD AND SYSTEM FOR SELECTING A PROGRAM FOR DOWNLOAD", which is incorporated herein by reference.

BACKGROUND OF THE INVENTION

1. Field of the Invention

The invention pertains generally to downloading a program from a host system to a target system and, more particularly, to a method for selecting a program for downloading. The invention also relates to a system for downloading a program from a host system to a target system.

2. Background Information

It is known to bundle various versions of handheld electronic device software code with desktop software code inside a single monolithic installer. As a result, the decision of what handheld software modules are to be included has to be made at the time the monolithic installer is built. This requires that the desktop software must be redeployed each time that any handheld electronic device software code update is required for any supported handheld electronic device. Hence, there is a relatively large count of monolithic installer variants, one for each possible combination of supported desktop/handheld electronic devices. Therefore, with increasing numbers of different handheld electronic device models, the building of the monolithic installer is increasingly unsustainable.

For wireless handheld electronic devices that are supported by a variety of wireless (e.g., 2.5G) vendors (e.g., service providers or carriers), there has been a distinct requirement from those vendors to specifically test handheld electronic device software from a network-specific standpoint as well as some application-level functionality. There is also the variability of launch timelines that differ from vendor to vendor. This inserts variability into the specific software version that a vendor will launch with. For example, a vendor may go with the best available software version that, also, fits into the vendor's launch timelines.

As a result, different vendors will have "approved" different versions of handheld electronic device software for a particular handheld model at any given time. Hence, a first vendor may approve one version of software, a second vendor may approve another version of software, and a third vendor may approve still another version of software.

For example, this creates problems for the information technology department of an enterprise that desires to manage a single software load (e.g., from a personal computer or workstation). Typically, that department asks the critical question "What CD should I push out to my internal user community? The one from vendor A or vendor B or vendor C?" Hence, given the growing complexity of handheld electronic devices, such as "smartphones" and "wireless converged handhelds," this phenomenon of various different handheld software versions for various different vendors will not be going away. Accordingly, there is room for improvement in methods and systems for selecting a program for download.

SUMMARY OF THE INVENTION

These needs and others are met by the invention, which employs an identifier, such as a vendor identifier and a hardware identifier, in a target system, stores a plurality of identifiers at a host system, associates the identifiers with programs, sends the identifier from the target system to the host system over a communication channel, and employs the identifiers at the host system and the sent identifier to select one the programs for download from the host system to the target system.

In accordance with one aspect of the invention, a method of selecting a program for download from a host system to a target system comprises: storing a plurality of programs at the host system; storing a plurality of identifiers at the host system, with each of at least some of the identifiers being associated with at least one of the programs; connecting the host system and the target system by a communication channel; sending an identifier from the target system to the host system over the communication channel; receiving the identifier as a received identifier at the host system; and employing the identifiers and the received identifier to select one of the at least one of the programs for download from the host system to the target system.

The method may include employing as the programs a plurality of application programs; including an application loader at the host system; requesting the identifier from the target system by the application loader over the communication channel; receiving the identifier as the received identifier at the application loader; determining that the received identifier matches one of the identifiers and responsively selecting one of the application programs; and downloading the selected one of the application programs over the communication channel from the application loader to the target system.

The method may include employing with the identifier a vendor identifier; sending the vendor identifier from the target system to the host system over the communication channel; receiving the vendor identifier at the host system; determining that the received vendor identifier matches one of the identifiers and responsively selecting one of the programs; and downloading the selected one of the programs over the communication channel from the host system to the target system.

The method may include storing a hardware identifier for the target system with the vendor identifier at the target system; requesting the hardware identifier and the vendor identifier from the target system by the host system over the communication channel; receiving the hardware identifier and the vendor identifier as the received identifier at the host system; employing a plurality of vendor identifiers and associating one of the vendor identifiers and at least one hardware identifier with each of the programs at the host system; determining that the received vendor identifier matches one of the vendor identifiers; and determining that the received hardware identifier matches the at least one hardware identifier associated with the one of the vendor identifiers and responsively downloading the selected one of the programs over the communication channel from the host system to the target system.

The method may include associating a version number with each of the programs; employing with the identifier a vendor identifier; storing the identifiers in a file at the host system; associating one of the identifiers in the file at the host system with one of the programs having the version number for the one of the programs; updating the file to associate the one of the identifiers with a new program, which is different than the programs, and which has a new version number, which is different than the version number; and storing the new program at the host system.

As another aspect of the invention, a system for selecting a program for download comprises: a host system including a memory storing a plurality of programs, the memory also storing a plurality of identifiers, with each of at least some of the identifiers being associated with at least one of the programs; a target system including an identifier; a communications channel connecting the host system and the target system; and a loader routine adapted to execute at the host system, communicate with the target system through the communications channel, request the identifier as a received identifier from the target system over the communication channel, and employ the identifiers and the received identifier to select one of the at least one of the programs for download from the host system to the target system.

The identifier of the target system may include a vendor identifier associated with a wireless communication vendor. The target system may include a first wired communication port adapted to communicate with the communication channel, and a second wireless communication port adapted to communicate with the wireless communication vendor.

The identifier of the target system may include a hardware identifier for the target system and a vendor identifier for a vendor associated with the target system.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "host system" shall expressly include, but not be limited by, a workstation, a personal computer, a desktop system, a server, and a wide range of sources for selecting a program for and/or downloading a program to a target system.

As employed herein, the term "target system" shall expressly include, but not be limited by, a mobile electronic device, a handheld electronic device, a wireless handheld electronic device, and a wide range of destinations for downloading a program from a host system.

The invention is disclosed in connection with selecting and/or downloading application programs from a workstation or personal computer to a handheld electronic device, although the invention is applicable to selecting and/or downloading programs from a wide range of host systems to a wide range of target systems.

Figure 1:
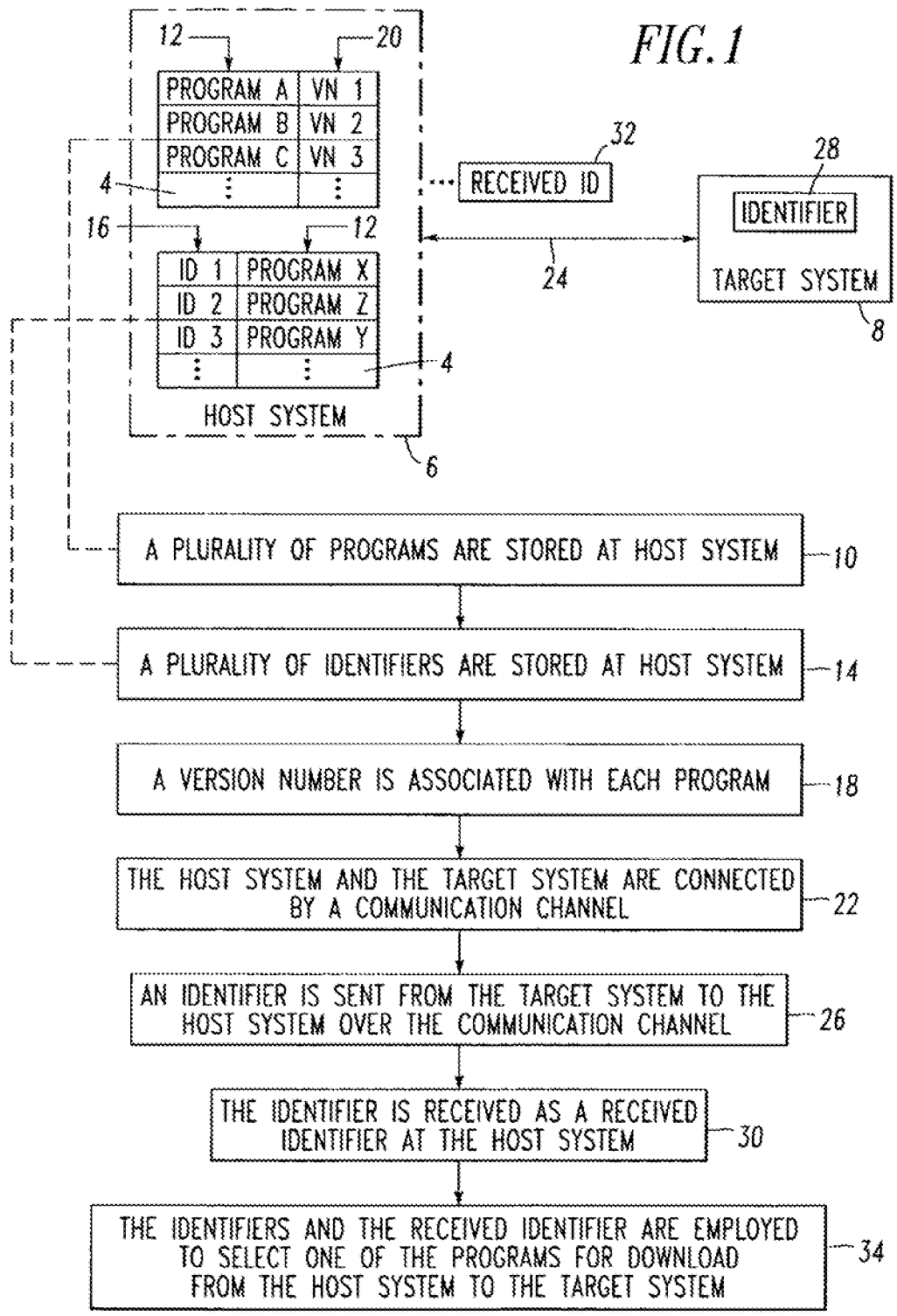
FIG. 1 is a flowchart of steps for selecting a program for download from a host system to a target system in accordance with an embodiment of the invention.

Referring to FIG. 1, a flowchart 2 includes steps for selecting a program 4 for download from a host system 6 (e.g., a workstation) to a target system 8 (e.g., a handheld electronic device). At 10, a plurality of programs 12 (e.g., programs A-C; programs X-Z) are stored at the host system 6. Next, at 14, a plurality of identifiers 16 (e.g., ID1; ID2; ID3) are stored at the host system 6, with each of at least some of the identifiers 16 being associated with one or more of the programs 12. At 18, a version number 20 (e.g., VN1; VN2; VN3) is preferably associated with each of the programs 12. Then, at 22, the host system 6 and the target system 8 are connected by a communication channel 24. At 26, an identifier 28 is sent from the target system 8 to the host system 6 over the communication channel 24. Next, at 30, the identifier 28 is received as a received identifier 32 at the host system 6. Then, at 34, the identifiers 16 and the received identifier 32 are employed to select one of the at least one of the programs 12, such as program 4, for download from the host system 6 to the target system 8.

Figure 2:
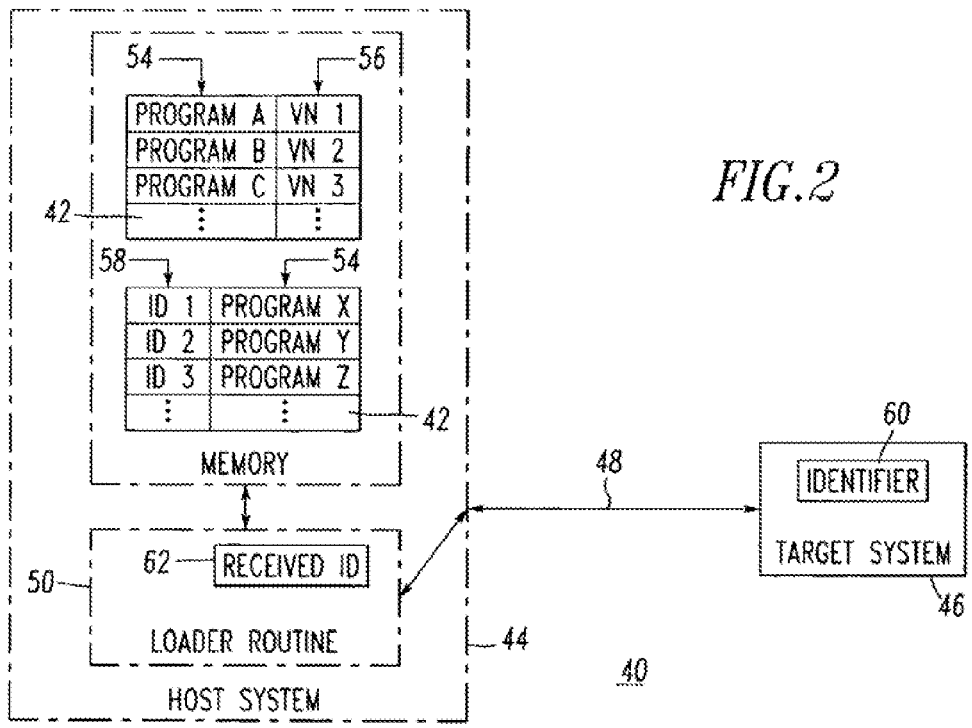
FIG. 2 is a block diagram of a system for selecting a program for download from a host system to a target system in accordance with another embodiment of the invention.

FIG. 2 shows a system 40 for selecting a program 42 for download from a host system 44 to a target system 46. The system 40 includes the host system 44, the target system 46, a communications channel 48 connecting the host system and the target system; and a loader routine 50 adapted to execute at the host system 44. The host system 44 includes a memory 52 storing a plurality of programs 54, with a version number 56 preferably being associated with each of the programs. The memory 52 also stores a plurality of identifiers 58, with each of at least some of the identifiers being associated with one or more of the programs 54. The target system 46 includes an identifier 60. The loader routine 50 is adapted to communicate with the target system 46 through the communications channel 48, request the identifier 60 as a received identifier 62 from the target system 46 over the communication channel 48, and employ the identifiers 58 and the received identifier 62 to select one of the one or more programs 54, such as program 42, for download from the host system 44 to the target system 46.

Figure 3:
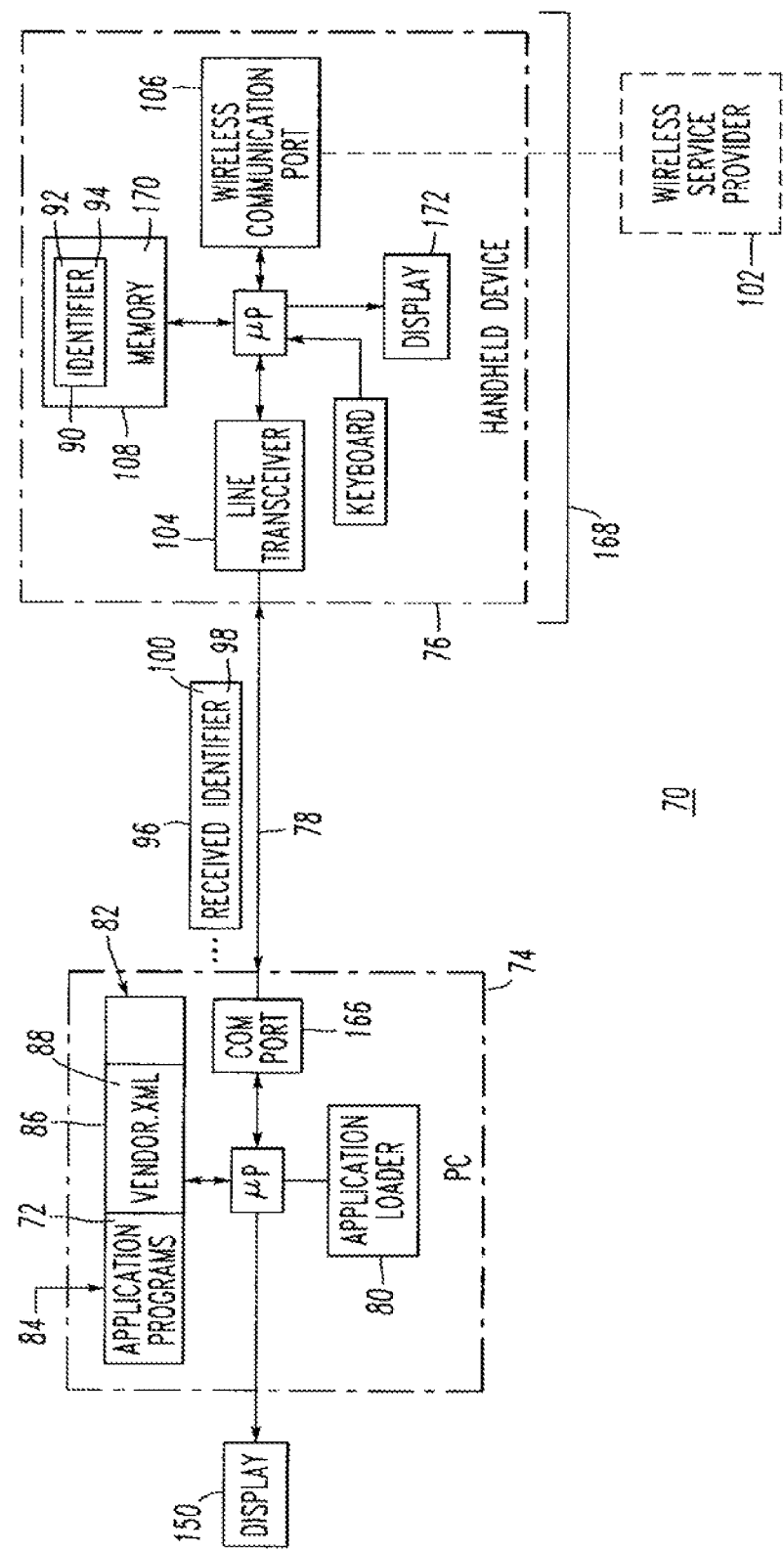
FIG. 3 is a block diagram of a system for selecting an application program for download from a personal computer to a wireless handheld electronic device in accordance with another embodiment of the invention.

FIG. 3 shows a system 70 for selecting a program 72 for download from a personal computer (PC) 74 to a mobile device, such as a wireless handheld electronic device 76. The system 70 includes the PC 74, the wireless handheld electronic device 76, a suitable communications channel, such as an RS-232 cable 78, connecting the PC 74 and the handheld electronic device 76, and an application loader routine 80 adapted to execute at the PC 74. The PC 74 includes a disk sub-system 82 storing a plurality of application programs 84 and a vendor.xml file 86 including a plurality of vendor identifiers 88, with each of at least some of these vendor identifiers 88 being associated with one or more of the application programs 84. The handheld electronic device 76 includes an identifier 90, which has a vendor identifier 92 and a hardware identifier 94. The application loader routine 80 is adapted to communicate with the handheld electronic device 76 through the cable 78, request the vendor identifier 92 and the hardware identifier 94 as a received identifier 96, and employ the identifiers 88, the received vendor identifier 98 and the received hardware identifier 100 to select one of the one or more application programs 84 for download from the PC 74 to the handheld electronic device 76.

The vendor identifier 92 is associated with a wireless communication vendor, such as wireless service provider 102 (shown in phantom line drawing). The handheld electronic device 76 includes a first wired communication port 104 adapted to communicate through the cable 78 and a second wireless communication port 106 adapted to communicate with the wireless communication vendor 102. Although an example target system, such as the wireless handheld electronic device 76 is shown, a wide range of target systems may be employed.

Figure 4:
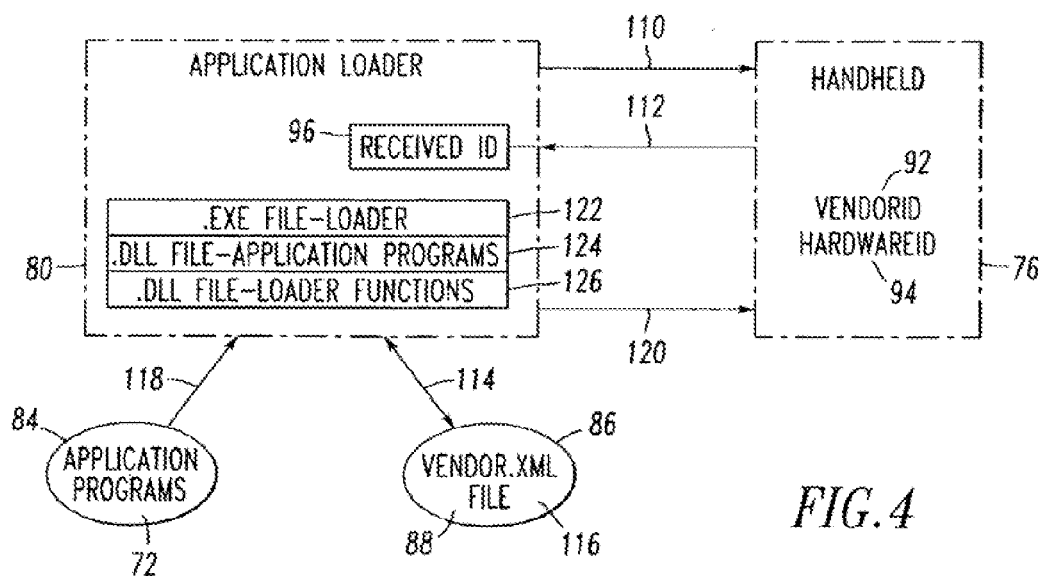
FIG. 4 is a block diagram showing communications by the personal computer and the wireless handheld electronic device of FIG. 3.

Referring to FIG. 4, the communications by the PC application loader 80 and the handheld electronic device 76 of FIG. 3 are shown. First, at 110, the application loader 80 connects to the handheld electronic device 76 and requests the vendor identifier (VendorID) 92 and the hardware identifier (HardwareID) 94. Next, at 112, the handheld electronic device 76 sends the vendor identifier 92 and the hardware identifier 94 to the application loader 80, which reads the received identifier 96 that includes the pair of identifiers 92,94. Then, at 114, the application loader 80 checks the vendor.xml file 86 to determine whether the received identifier 96 (that includes the pair of identifiers 92,94) matches one of the identifiers 88 in the file 86 and, if so, to responsively select one of the application programs 84 by obtaining a version number 116 from the file 86 based upon that received identifier 96. Next, at 118, based upon the version number 116, the application loader 80 selects one of the application programs 84, such as 72. Finally, if the appropriate binary application program 72 was available, then, at 120, the application loader 80 downloads that selected application program 72 to the handheld electronic device 76.

The example application loader 80 includes an executable loader file 122, a dynamic link library file 124 of application programs to download, and a dynamic link library file 126 of programs associated with various application loader functions.

Examples of the handheld electronic device 76 are disclosed in U.S. Pat. Nos. 6,452,588; and 6,489,950, which are incorporated by reference herein.

An example of the vendor.xml file 86 is shown in the Appendix, below, and is referenced in connection with Examples 1-3, below.

EXAMPLE 1

As one example, the received identifier 96 of FIG. 4 may include the value 0x82 (e.g., 82H) as the vendor identifier 92 and the value 0x80000403 (e.g., 80000403H) as the hardware identifier 94. First, the application loader 80 performs a text search of the file 86 looking for "vendor id="0x82"". As shown on the twelfth line (page 23) of the Appendix, that search is successful. Here, the particular vendor id of 0x82 is associated with a corresponding vendor, Swisscom. Then, the application loader 80 performs a text search of the file 86 (after that twelfth line) looking for "<devicehwid> followed by "0x80000403" before reaching "</vendor>". As shown on the fourteenth line (page 23) of the Appendix, that search is also successful. Next, the application loader 80 performs a text search of the file 86 (after that fourteenth line) looking for any other instance of "<devicehwid> followed by "0x80000403" before reaching "</vendor>". Here, there is none. Then, the application loader 80 performs a text search of the file 86 looking for "version=" prior to the sole relevant instance of "<devicehwid>. As shown on the thirteenth line (page 23) of the Appendix, that search is also successful. Next, the application loader 80 reads the version number as "3.6.0.38". With this information, the application loader 80 determines that the received identifier 96 matches one of the identifiers (e.g., vendor id=0x82 and hardware id=0x80000403) in the file 86 and responsively selects the corresponding one of the application programs 84 based upon the version number "3.6.0.38". Finally, the application loader 80 downloads that selected one of the application programs 84 to the handheld electronic device 76.

EXAMPLE 2

In this example, the received identifier 96 may only include the vendor identifier 92, or, if the hardware identifier 94 is included, that value is ignored by the application loader 80. Here, similar to Example 1, the received identifier 96 may include the value 0x82 (e.g., 82H) as the vendor identifier 92. First, the application loader 80 performs a text search of the file 86 looking for "vendor id="0x82"". As shown on the twelfth line (page 23) of the Appendix, that search is successful. Here, the particular vendor id of 0x82 is associated with a corresponding vendor, Swisscom. Then, the application loader 80 performs a text search of the file 86 (after that twelfth line) looking for "version=" prior to the instance of "</vendor>. As shown on the thirteenth line of the Appendix, that search is also successful. Next, the application loader 80 reads the version number as "3.6.0.38". With this information, the application loader 80 determines that the received identifier 96 matches one of the identifiers (e.g., vendor id=0x82) in the file 86 and responsively selects the corresponding one of the application programs 84 based upon the version number "3.6.0.38". Finally, the application loader 80 downloads that selected one of the application programs 84 to the handheld electronic device 76.

EXAMPLE 3

In this example, the received identifier 96 includes both the vendor identifier 92 and the hardware identifier 94, and the file 86 includes a plurality of instances of the particular value of the hardware identifier 94 for the particular value of the vendor identifier 92. For example, referring to page 20, lines 7-26 of the Appendix, there are four different version numbers (3.6.0.38; 3.6.0.59, 3.6.0.73; and 3.6.0.83) associated with the particular value 0x80000403 of the hardware identifier 94 for the particular value 0x78 of the vendor identifier 92.

Here, the received identifier 96 includes the value 0x78 (e.g., 78H) as the vendor identifier 92 and the value 0x80000403 (e.g., 80000403H) as the hardware identifier 94. First, the application loader 80 performs a text search of the file 86 looking for "vendor id="0x78"". As shown on the seventh line (page 20) of the Appendix, that search is successful. Here, the particular vendor id of 0x78 is associated with a corresponding vendor, VODAFONE (UK). Then, the application loader 80 performs a text search of the file 86 looking for "<devicehwid> followed by "0x80000403" before reaching "</vendor>". As shown on the ninth line (page 20) of the Appendix, that search is also successful. Next, the application loader 80 performs a text search of the file 86 (after the ninth line) looking for any other instance of "<devicehwid> followed by "0x80000403" before reaching "</vendor>". Here, three instances are found at the twelfth, fifteenth and eighteenth lines (page 20) of the Appendix. Then, the application loader 80 performs a text search of the file 86 looking for "version=" prior to the four instances of "<devicehwid>. As shown on the eighth, eleventh, fourteenth and seventeenth lines (page 20) of the Appendix, that search is also successful. Next, the application loader 80 reads the four version numbers as "3.6.0.38," "3.6.0.59," "3.6.0.73" and "3.6.0.83". With this information, the application loader 80 responsively selects the corresponding one of the application programs 84 having the largest version number, which in this example is "3.6.0.83". Hence, in this example, version "3.6.0.83" has been approved by the corresponding vendor (e.g., VODAFONE (UK)) for the particular hardware identifier and has the highest version number of the four different approved software versions. Finally, the application loader 80 downloads that selected one of the application programs 84 (having version number 3.6.0.83) to the handheld electronic device 76.

EXAMPLE 4

As was discussed above, the application loader 80 downloads the selected application program, such as 72 of FIG. 3, over the communication cable 78 from the PC 74 to the wireless handheld electronic device 76. In turn, the device 76 loads the application program 72 in memory 108 and executes the same.

Figure 5:
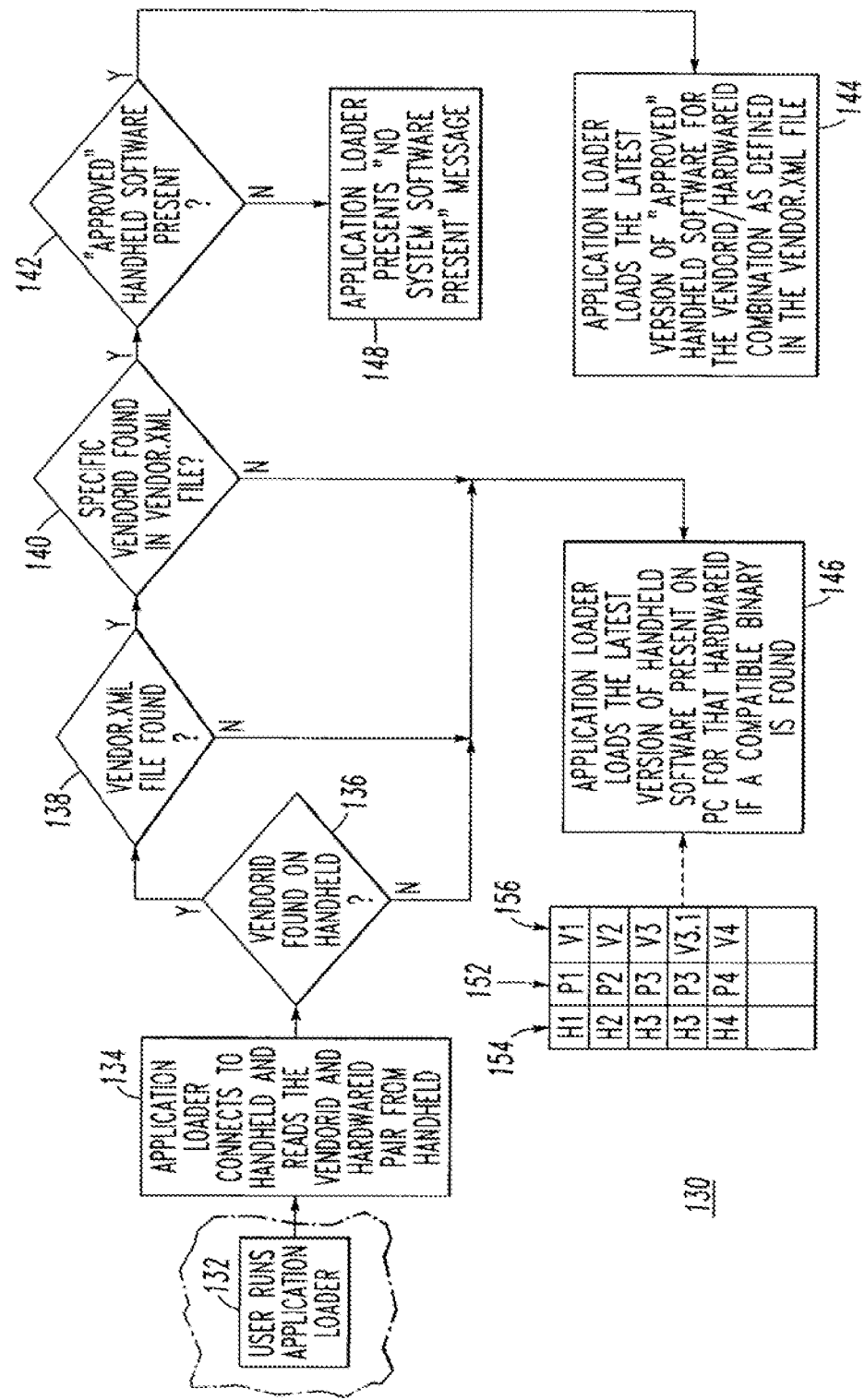
FIG. 5 is a flowchart of the application loader of FIG. 3.

FIG. 5 shows a flowchart 130 of the application loader 80 of FIG. 3. The application loader 80 separates software for the PC 74 and the software for the handheld electronic device 76 and employ a "VendorID" and/or a "HardwareID" to determine the appropriate (i.e., specific vendor "approved") handheld electronic device software, such as application program 72, to load onto a particular handheld electronic device, such as 76.

The application loader 80 employs logic to automatically load the appropriate vendor-approved handheld electronic device software for a particular handheld electronic device based on the VendorID and/or HardwareID of that device. The application loader 80 checks the file 86 of FIG. 3 that effectively lists the acceptance information for given VendorIDs (i.e., corresponding to vendors, such as 102 of FIG. 3). Based on the software that is present in the PC 74 to load and the information in the file 86, the application loader 80 loads the appropriate software without requiring the user or another entity (e.g., an information technology (IT) department) to have to manually manage a plurality of different software loads.

The VendorID (e.g., as internally assigned by the proprietor of the handheld electronic devices) is an assigned number that is included in a VSM (or branding sector) file (not shown) on the handheld electronic device 76 of FIG. 3. The VendorID is checked by the application loader 80 against the Vendor.xml file 86 that tracks which software has been accepted by which vendor, such as 102. In turn, the application loader 80 loads the appropriate software on the handheld electronic device 76 based on this information.

The application loader 80 loads the appropriate handheld software on each handheld electronic device, such as 76, as authorized by the corresponding vendor, such as service provider 102. The application loader 80 (e.g., a handheld software sub-installer) is configured in two ways: (1) the HardwareID defines the handheld models on which the handheld software can be loaded; and (2) the VendorID defines the vendor to which one or more versions of handheld software applies.

First, at 132, a user initiates execution (e.g., from a suitable user interface (not shown) of the PC 74 of FIG. 3) of the application loader 80. Next, at 134, the application loader 80 connects to the handheld electronic device 76 and reads the VendorID and the HardwareID pair from the handheld electronic device, as was discussed, above, in connection with steps 110 and 112 of FIG. 4. Then, at 136, it is determined if the VendorID was found on the handheld electronic device 76. For example, the VendorID 92 (e.g., a positive integer) is normally stored in the memory 108 of the handheld electronic device 76 and is returned to the application loader 80 with the received identifier 96 of FIG. 3. If, however, the handheld electronic device 76 is "unbranded" and, thus, is not associated with a particular vendor, then the VendorID 92 is set to a neutral, null or zero value.

Otherwise, if the VendorID is a positive integer, then execution resumes at 138, where the application loader 80 checks for the presence of the Vendor.xml file 86 in the disk sub-system 82 of the PC 74. If the Vendor.xml file 86 is found, then execution resumes at 140.

Next, at 140, it is determined if the specific VendorID is found (e.g., by performing a text search) in the Vendor.xml file 86. If so, then one of the identifiers 88 in the file 86 matches the received identifier 96 of FIG. 3. Then, execution resumes at 142, where it is determined if "approved" handheld software is present in the PC disk sub-system 82. This determination is made by employing any of Examples 1-3, above. Preferably, the HardwareID is also employed and the application loader 80 determines the highest version number of the software associated with the pair formed by the VendorID and the HardwareID. Based upon that version number, such as 20 of FIG. 1, the corresponding one of the programs 12 of FIG. 1 is identified and it is determined if that program is present in the PC disk sub-system 82. If so, then at 144, the application loader 80 downloads that "approved" handheld software to the handheld electronic device 76.

If any of the tests at 136, 138 or 140 fail, then, at 146, the application loader 80 downloads to the handheld electronic device 76 the latest version of the handheld electronic device software that is present in the PC disk sub-system 82. For example, the PC disk sub-system 82 may include one or more binaries that correspond to particular HardwareID values. Hence, for example, associated with HardwareID 0x90000503, there may be one or more programs having corresponding version numbers. Here, the application loader 80 selects the program having the highest version number and downloads that program to the handheld electronic device 76.

If test 142 fails, which means that none of the programs 84 of FIG. 3 corresponds to the received identifier 96, then, at 148, the application loader 80 responsively displays a "No System Software present" message on the display 150 of the PC 74 of FIG. 3.

The application loader 80 uses the Vendor.xml file 86 to determine which handheld software version can be loaded to the handheld electronic device 76. The application loader 80 applies the following rules: (1) if the handheld electronic device 76 is unbranded, as determined at 136, and, thus, includes no VSM file and no VendorID 92, or (2) if the Vendor.xml file 86 is not found at 138, or (3) if the Vendor.xml file 86 does not contain the handheld electronic device's VendorID, as determined at 140, and as read from the handheld electronic device 76, then the application loader 80 selects and loads, at 146, the handheld software with the highest version number that applies to the handheld electronic device 76. Otherwise, if the handheld electronic device's VendorID 92, as read from the handheld electronic device 76, is found in Vendor.xml file 86, then the application loader 80 selects and loads the "approved" handheld software with the highest version number for that VendorID 92 that is installed on the PC 74. Finally, if no "approved" handheld electronic device software is present, at 142, for that VendorID 92, then the application loader 80 displays the "No System Software present" message, at 148, and the downloading process is discontinued.

In addition to the application programs 84 of FIG. 3, the PC disk sub-system 82 includes a plurality of programs 152 (e.g., P1, P2, P3, P4 of FIG. 5) that are associated with corresponding hardware identifiers 154 (e.g., H1, H2, H3, H4) and corresponding version numbers 156 (e.g., V1, V2, V3, V4). Also, one of the programs 152 (e.g., P3) may be associated with more than one version number 156 (e.g., V3, V3.1). Step 146 downloads one of the programs 152 associated with the corresponding one of the hardware identifiers 154 with the highest one of the version numbers 156 that applies to the particular handheld electronic device as defined by its corresponding one of the hardware identifiers 154.

Figure 6:
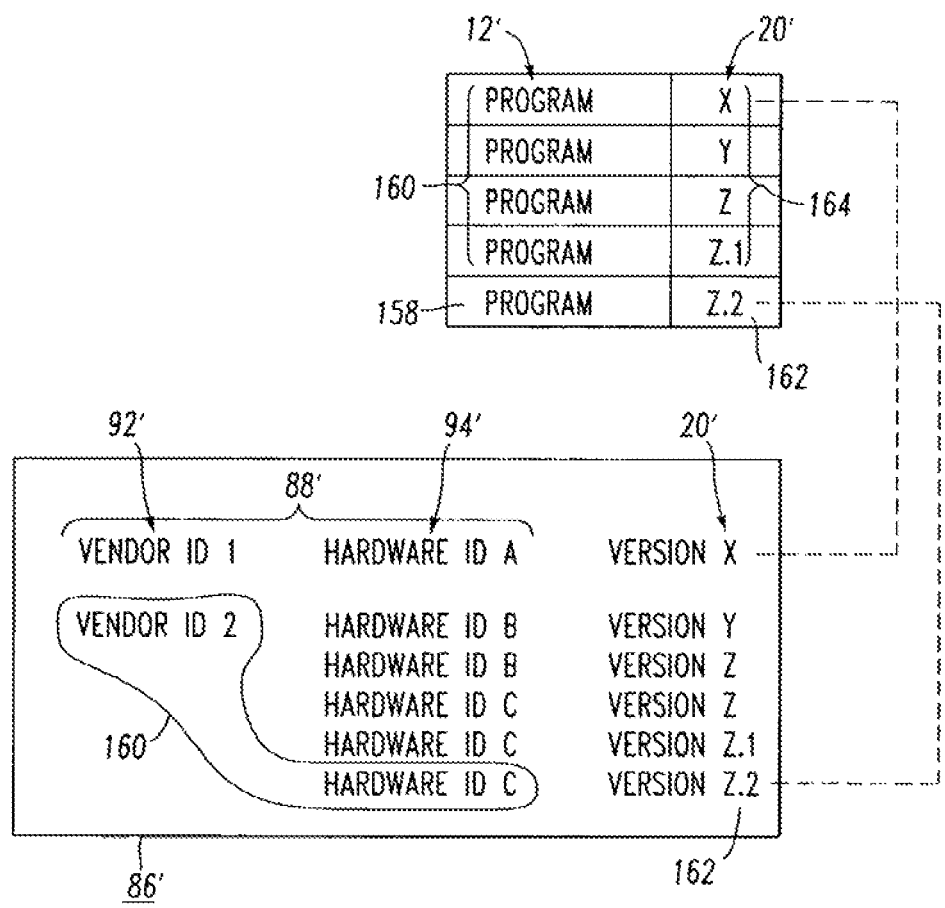
FIG. 6 is a block diagram showing an update of the file of FIG. 3.

FIG. 6 shows the update of a Vendor.xml file 86', which is similar to the file 86 of FIG. 3. The file 86' includes a plurality of identifiers 88', which include both VendorIDs 92' and HardwareIDs 94'. Each of the identifiers 88' (e.g., VENDOR ID 1 and HARDWARE ID A) is associated with a corresponding one of the version numbers 20' (e.g., VERSION X). In turn, each of the identifiers 88' (e.g., VENDOR ID 1 and HARDWARE ID A) in the file 86' is associated, through the versions numbers 20', with a corresponding one of the programs 12' having that version number (e.g., VERSION X). In turn, with new releases of application programs, such as program 158, the file 86' is updated to associate the corresponding one of the identifiers, such as 160, with the new program 158, which is different than the other programs 160, and which has a new version number 162 (e.g., Version Z.2), which is different than the other version numbers 164. In turn, that application program 158, is stored in the PC disk subsystem 82.

EXAMPLE 5

The PC 74 may include handheld model specific files, which are specific to a particular handheld electronic device or family of handheld electronic devices, such as the executable code for the handheld electronic device, and handheld electronic device specific documentation, such as a users guide. The PC 74 may further include handheld model sensitive files, which are not necessarily handheld electronic device specific, but which may require updating when new handheld models become available.

The application loader 80 may provide a plurality of handheld electronic device sub-installers, in which each set of handheld model specific files is deployed in a dedicated handheld sub-installer, which is packaged as a single-file, self-extracting executable. Preferably, only one such installer is employed for each type of handheld electronic device. However, since different vendors may accept different versions of application programs and since maintenance updates are generally employed, there may be a plurality of different variants for any particular device type.

The handheld model sensitive files may be packaged in an InstallShield installation "object", and included in the handheld sub-installers. These files may be installed as "shared components," employing versioning to ensure that only the most recent version, as installed by the handheld sub-installer, is retained.

Hence, instead of one monolithic installer, with many variants, there may be a plurality of "component-based" installers, each which contains only one principal deliverable.

EXAMPLE 6

Before loading a new application program to the handheld electronic device 76, the cable 78 of FIG. 3 is connected to the serial (or USB) port (e.g., COM port) 166 of the PC 74 and the handheld electronic device 76 is placed in a cradle 168. The user typically places the handheld electronic device 76 in the interface cradle 168 that is electrically connected to the PC 74 through a suitable form of local, dedicated communication, such as the serial cable 78 or an infrared/Bluetooth channel (not shown) or another other type of wireless communications channel (not shown). The application loader 80 executing on the PC 74 and other software 170 executing on the handheld electronic device 76 communicate through the local communications channel of the serial cable 78 to cause the PC 74 to download information for storage in the memory 108 of the handheld electronic device 76.

EXAMPLE 7

The application loader 80 may be launched from another program (not shown) executing on the PC 74. For example, after opening that other program, the user places the handheld electronic device 76 in the cradle 168 and connects it to the PC 74 by the cable 78. The user then double-clicks on "application loader" (not shown) in the display 150 of FIG. 3. Then a suitable window (not shown) is displayed, which advises the user to connect the handheld electronic device 76 to the PC 74 before loading new software.

Next, the user would click "Next" (not shown) in the display window (not shown) to start the process of loading new software onto the handheld electronic device 76. For example, an "Initialization Progress" dialog box (not shown) would appear on the PC display 150 to indicate that the application loader 80 is connecting to the handheld electronic device 76 and is reading the handheld electronic device's configuration, including the VendorID 92 and the HardwareID 94 of FIG. 4. At the same time, the display 172 of the handheld electronic device 76 would show a message "Loader activity . . . " (not shown). Finally, the user waits until the downloading is completed and the dialog box on the PC display 150 disappears.

EXAMPLE 8

An example of the Vendor.xml file 86 of FIG. 3 is shown in the Appendix. This file 86 is created as follows. There is a single protected file, Vendor.xml, that lists all the information required by the application loader 80 of FIG. 3. The file 86 is managed by the proprietor of the handheld electronic devices, such as 76 of FIG. 3. When a carrier, such as the wireless service provider 102, accepts software, the file 86 is updated to note that acceptance. In turn, the file 86 is included into the handheld sub-installer for that carrier to be distributed with the approved handheld software. The Vendor.xml file 86, which lets the application loader 80 know what software is approved, is an ever cumulative file that grows as carriers, such as 102, accept software.

While for clarity of disclosure reference has been made herein to the exemplary displays 150,172 for displaying information, such as an error message, it will be appreciated that such information may be stored, printed on hard copy, be computer modified, or be combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

APPENDIX

- <vendorsrc version="1.0.0.52">
- <vendor id="0x64" Name="T-Mobile US">
- <bundle id="System" version="3.6.0.51">
  <devicehwid>0x80000403 0x80000503</devicehwid>

APPENDIX-continued

```xml
  </bundle>
- <bundle id="System" version="3.6.0.73">
    <devicehwid>0x80000103 0x80000403 0x80000503</devicehwid>
  </bundle>
- <bundle id="System" version="3.7.0.50">
    <devicehwid>0x90000503 0x94000503</devicehwid>
  </bundle>
- <bundle id="System" version="3.7.0.99">
    <devicehwid>0x90000503</devicehwid>
  </bundle>
  </vendor>
- <vendor id="0x65" Name="AWS">
- <bundle id="System" version="3.6.0.51">
    <devicehwid>0x80000103 0x80000403 0x80000503</devicehwid>
  </bundle>
- <bundle id="System" version="3.6.0.73">
    <devicehwid>0x80000103 0x80000503 0x80000403</devicehwid>
  </bundle>
- <bundle id="System" version="3.6.0.87">
    <devicehwid>0x80000103, 0x80000503, 0x80000403</devicehwid>
  </bundle>
- <bundle id="System" version="3.7.0.73">
    <devicehwid>0x94000503</devicehwid>
  </bundle>
- <bundle id="System" version="3.7.0.125">
    <devicehwid>0x90000503 0x94000503</devicehwid>
  </bundle>
  </vendor>
- <vendor id="0x66" Name="Cingular Wireless">
- <bundle id="System" version="3.6.0.51">
    <devicehwid>0x80000103 0x80000403 0x80000503</devicehwid>
  </bundle>
- <bundle id="System" version="3.6.0.87">
    <devicehwid>0x80000103, 0x80000503, 0x80000403</devicehwid>
  </bundle>
- <bundle id="System" version="3.7.0.101">
    <devicehwid>0x90000503 0x94000503</devicehwid>
  </bundle>
  </vendor>
- <vendor id="0x67" Name="Nextel">
- <bundle id="System" version="3.6.1.31">
    <devicehwid>0x00000505</devicehwid>
  </bundle>
- <bundle id="System" version="3.6.1.51">
    <devicehwid>0x00000505</devicehwid>
  </bundle>
- <bundle id="System" version="3.6.1.64">
    <devicehwid>0x00000505</devicehwid>
  </bundle>
- <bundle id="System" version="3.7.1.24">
    <devicehwid>0x04000505</devicehwid>
  </bundle>
- <bundle id="System" version="3.7.1.29">
    <devicehwid>0x04000505</devicehwid>
  </bundle>
  </vendor>
- <vendor id="0x69" Name="Verizon">
- <bundle id="System" version="3.6.1.29">
    <devicehwid>0x00000104</devicehwid>
  </bundle>
- <bundle id="System" version="3.6.1.38">
    <devicehwid>0x00000104</devicehwid>
  </bundle>
- <bundle id="System" version="3.6.1.71">
    <devicehwid>0x00000104 0x00000404</devicehwid>
  </bundle>
  </vendor>
- <vendor id="0x6B" Name="Rogers">
- <bundle id="System" version="3.6.0.51">
    <devicehwid>0x80000403 0x80000103 0x80000503</devicehwid>
  </bundle>
- <bundle id="System" version="3.6.0.73">
    <devicehwid>0x80000103 0x80000503 0x80000403</devicehwid>
  </bundle>
- <bundle id="System" version="3.7.0.125">
    <devicehwid>0x90000503 0x94000503</devicehwid>
  </bundle>
  </vendor>
- <vendor id="0x6D" Name="BWA (Aliant/Sasktel)">
- <bundle id="System" version="3.6.1.24">
    <devicehwid>0x00000104</devicehwid>
  </bundle>
  </vendor>
- <vendor id="0x6F" Name="MM02 DE">
- <bundle id="System" version="3.6.0.38">
    <devicehwid>0x80000103 0x80000403</devicehwid>
  </bundle>
- <bundle id="System" version="3.6.0.73">
    <devicehwid>0x80000103 0x80000403</devicehwid>
  </bundle>
  </vendor>
- <vendor id="0x72" Name="T-Mobile DE/AU">
- <bundle id="System" version="3.6.0.38">
    <devicehwid>0x80000103 0x80000403</devicehwid>
  </bundle>
- <bundle id="System" version="3.7.0.26">
    <devicehwid>0x90000503 0x94000503</devicehwid>
  </bundle>
- <bundle id="System" version="3.7.0.113">
    <devicehwid>0x90000503 0x94000503</devicehwid>
  </bundle>
  </vendor>
- <vendor id="0x73" Name="TIM">
- <bundle id="System" version="3.6.0.38">
    <devicehwid>0x80000403</devicehwid>
  </bundle>
- <bundle id="System" version="3.7.0.50">
    <devicehwid>0x94000503</devicehwid>
  </bundle>
- <bundle id="System" version="3.7.0.102">
    <devicehwid>0x94000503</devicehwid>
  </bundle>
  </vendor>
- <vendor id="0x74" Name="Hutchison">
- <bundle id="System" version="3.6.0.54">
    <devicehwid>0x80000103</devicehwid>
  </bundle>
- <bundle id="System" version="3.7.0.73">
    <devicehwid>0x94000503</devicehwid>
  </bundle>
  </vendor>
- <vendor id="0x76" Name="SFR">
- <bundle id="System" version="3.6.0.35">
    <devicehwid>0x80000103 0x80000403</devicehwid>
  </bundle>
- <bundle id="System" version="3.7.0.91">
    <devicehwid>0x94000503</devicehwid>
  </bundle>
  </vendor>
- <vendor id="0x78" Name="VODAFONE (UK)">
- <bundle id="System" version="3.6.0.38">
    <devicehwid>0x80000103 0x80000403 0x80000503</devicehwid>
  </bundle>
- <bundle id="System" version="3.6.0.59">
    <devicehwid>0x80000403</devicehwid>
  </bundle>
- <bundle id="System" version="3.6.0.73">
    <devicehwid>0x80000103 0x80000403 0x80000503</devicehwid>
  </bundle>
- <bundle id="System" version="3.6.0.83">
    <devicehwid>0x80000103, 0x80000503, 0x80000403</devicehwid>
  </bundle>
- <bundle id="System" version="3.7.0.91">
    <devicehwid>0x94000503</devicehwid>
  </bundle>
- <bundle id="System" version="3.7.0.127">
    <devicehwid>0x94000503 0x94000403</devicehwid>
  </bundle>
  </vendor>
- <vendor id="0x79" Name="Telcel">
- <bundle id="System" version="3.6.0.73">
    <devicehwid>0x80000403</devicehwid>
  </bundle>
  </vendor>
- <vendor id="0x7A" Name="Telstra">
- <bundle id="System" version="3.6.0.54">
    <devicehwid>0x80000103</devicehwid>
  </bundle>
- <bundle id="System" version="3.7.0.50">
    <devicehwid>0x94000503</devicehwid>
```

APPENDIX-continued

```
     </bundle>
- <bundle id="System" version="3.7.0.102">
     <devicehwid>0x94000503</devicehwid>
     </bundle>
     </vendor>
- <vendor id="0x7B" Name="T-Mobile (UK)">
- <bundle id="System" version="3.6.0.38">
     <devicehwid>0x80000403</devicehwid>
     </bundle>
- <bundle id="System" version="3.7.0.26">
     <devicehwid>0x90000503 0x94000503</devicehwid>
     </bundle>
- <bundle id="System" version="3.7.0.113">
     <devicehwid>0x90000503 0x94000503</devicehwid>
     </bundle>
     </vendor>
- <vendor id="0x7C" Name="Vodafone Germany">
- <bundle id="System" version="3.7.0.82">
     <devicehwid>0x94000503</devicehwid>
     </bundle>
- <bundle id="System" version="3.7.0.91">
     <devicehwid>0x94000503</devicehwid>
     </bundle>
- <bundle id="System" version="3.7.0.127">
     <devicehwid>0x94000503</devicehwid>
     </bundle>
     </vendor>
- <vendor id="0x7D" Name="MM02 UK/IRL/NL">
- <bundle id="System" version="3.6.0.38">
     <devicehwid>0x80000103 0x80000403</devicehwid>
     </bundle>
- <bundle id="System" version="3.6.0.73">
     <devicehwid>0x80000103 0x80000403</devicehwid>
     </bundle>
- <bundle id="System" version="3.7.0.127">
     <devicehwid>0x94000403</devicehwid>
     </bundle>
     </vendor>
- <vendor id="0x7E" Name="Telus">
- <bundle id="System" version="3.6.1.29">
     <devicehwid>0x00000104</devicehwid>
     </bundle>
     </vendor>
- <vendor id="0x7F" Name="SMART">
- <bundle id="System" version="3.6.0.59">
     <devicehwid>0x80000403</devicehwid>
     </bundle>
     </vendor>
- <vendor id="0x80" Name="Starhub">
- <bundle id="System" version="3.6.0.59">
     <devicehwid>0x80000403</devicehwid>
     </bundle>
- <bundle id="System" version="3.6.0.73">
     <devicehwid>0x80000403</devicehwid>
     </bundle>
- <bundle id="System" version="3.7.0.73">
     <devicehwid>0x94000503</devicehwid>
     </bundle>
- <bundle id="System" version="3.7.0.120">
     <devicehwid>0x94000503</devicehwid>
     </bundle>
     </vendor>
- <vendor id="0x81" Name="Telefonica">
- <bundle id="System" version="3.6.0.38">
     <devicehwid>0x80000403</devicehwid>
     </bundle>
- <bundle id="System" version="3.7.0.125">
     <devicehwid>0x94000503</devicehwid>
     </bundle>
     </vendor>
- <vendor id="0x82" Name="Swisscom">
- <bundle id="System" version="3.6.0.38">
     <devicehwid>0x80000403</devicehwid>
     </bundle>
- <bundle id="System" version="3.7.0.127">
     <devicehwid>0x94000403</devicehwid>
     </bundle>
     </vendor>
- <vendor id="0x84" Name="Vodafone (IT)">
- <bundle id="System" version="3.7.0.127">
     <devicehwid>0x94000503</devicehwid>
     </bundle>
     </vendor>
- <vendor id="0x85" Name="Vodafone (ES)">
- <bundle id="System" version="3.7.0.91">
     <devicehwid>0x94000503</devicehwid>
     </bundle>
     </vendor>
- <vendor id="0x86" Name="T-Mobile (NL)">
- <bundle id="System" version="3.7.0.113">
     <devicehwid>0x90000503 0x94000503</devicehwid>
     </bundle>
     </vendor>
- <vendor id="0x87" Name="Cincinnati Bell">
- <bundle id="System" version="3.7.0.73">
     <devicehwid>0x94000503</devicehwid>
     </bundle>
- <bundle id="System" version="3.7.0.125">
     <devicehwid>0x94000503</devicehwid>
     </bundle>
     </vendor>
     </vendorsrc>
```

The invention claimed is:

1. A method of selecting a program for download from a host system to a target system, the method comprising:
   storing a plurality of identifiers at the host system, with each of at least one of the plurality of identifiers being stored in association with at least one of a plurality of programs;
   connecting the host system and the target system by a communication channel;
   sending a vendor identifier from the target system to the host system over the communication channel, the vendor identifier identifying a wireless communication vendor supporting the target system;
   requesting the vendor identifier from the target system by the host system over the communication channel;
   receiving the vendor identifier at the host system;
   employing the plurality of identifiers and the received vendor identifier to select one of the at least one of the plurality of programs for download from the host system to the target system;
   associating a wireless communication vendor with the target system;
   determining that the received vendor identifier matches one of the plurality of identifiers and responsively selecting one of the at least one of the plurality of programs;
   downloading the selected one of the at least one of the plurality of programs over the communication channel from the host system to the target system; and
   failing to find the received vendor identifier at the host system and downloading, responsive to the failing to find the received vendor identifier at the host system, one of the at least one of the plurality of programs of a latest version over the communication channel from the host system to the target system.

2. The method of claim 1 further comprising:
   employing the plurality of programs as a plurality of application programs;
   including an application loader at the host system;
   requesting the vendor identifier from the target system by the application loader over the communication channel; and
   receiving the vendor identifier at the application loader.

3. The method of claim 1 further comprising:
   storing the vendor identifier at the target system;

employing a plurality of vendor identifiers and associating one of the plurality of vendor identifiers and at least one hardware identifier with each of the plurality of programs at the host system;
determining that the received vendor identifier matches one of the plurality of vendor identifiers; and
determining that a received hardware identifier matches the at least one hardware identifier associated with the one of the plurality of vendor identifiers and responsively downloading the selected one of the at least one of the plurality of programs over the communication channel from the host system to the target system.

4. The method of claim 1 further comprising:
storing a hardware identifier for the target system with the vendor identifier at the target system;
storing a program associated with the hardware identifier at the host system;
associating the vendor identifier and at least one hardware identifier with each of the plurality of programs at the host system;
determining that the received vendor identifier has a predetermined value; and
downloading the program associated with the hardware identifier over the communication channel from the host system to the target system.

5. The method of claim 1 further comprising:
loading and executing the downloaded and selected one of the at least one of the plurality of programs at the target system.

6. The method of claim 1 further comprising:
associating a version number with each of the plurality of programs;
storing the plurality of identifiers at the host system;
associating one of the plurality of identifiers stored in the file at the host system with one of the plurality of programs having the version number for the one of the plurality of programs; and
updating the file to associate the one of the plurality of identifiers with a new program, which is different than the plurality of programs, and which has a new version number, which is different than the version number for the one of the plurality of programs.

7. The method of claim 1 further comprising:
determining that none of the plurality of programs corresponds to the one of the plurality of identifiers and responsively displaying an error message at the host system.

8. The method of claim 1 further comprising:
creating the file for storing the plurality of identifiers.

9. The method of claim 8 wherein the creating comprises creating a single protected file.

10. The method of claim 8 further comprising:
updating the file to indicate acceptance of a software by the host system.

11. The method of claim 1 further comprising:
employing a wireless handheld electronic device as the target system;
downloading the selected one of the at least one of the plurality of programs over the communication channel from the host system to the wireless handheld electronic device; and
loading and executing the downloaded and selected one of the at least one of the plurality of programs at the wireless handheld electronic device to communicate with the wireless communication vendor.

12. A method of selecting a program for download from a host system to a target system, the method comprising:
storing a plurality of identifiers at the host system, with each of at least one of the plurality of identifiers being stored in association with at least one of a plurality of programs;
connecting the host system and the target system by a communication channel;
sending a vendor identifier from the target system to the host system over the communication channel, the vendor identifier identifying a wireless communication vendor supporting the target system;
requesting the vendor identifier from the target system by the host system over the communication channel;
receiving the vendor identifier at the host system;
employing the plurality of identifiers and the received vendor identifier to select one of the at least one of the plurality of programs for download from the host system to the target system;
storing the plurality of identifiers in a file at the host system;
associating a wireless communication vendor with the target system;
determining that the received vendor identifier matches one of the plurality of identifiers and responsively selecting one of the at least one of the plurality of programs;
downloading the selected one of the at least one of the plurality of programs over the communication channel from the host system to the target system; and
failing to find the received vendor identifier at the host system and downloading, responsive to the failing to find the received vendor identifier at the host system, one of the at least one of the plurality of programs of a latest version over the communication channel from the host system to the target system.

13. A system for selecting a program for download, the system comprising:
a host system including a memory storing a plurality of identifiers, with each of at least one of the plurality of identifiers being stored in association with at least one of a plurality of programs;
a target system including a memory storing a vendor identifier representing a wireless communication vendor associated with the target system, the vendor identifier identifying a wireless communication vendor supporting the target system;
a communication channel connecting the host system and the target system; and
a loader routine adapted to execute at the host system, communicate with the target system through the communication channel, request and receive the vendor identifier from the target system over the communication channel, and employ the plurality of identifiers and the received vendor identifier to select one of the at least one of the plurality of programs for download from the host system to the target system,
wherein the loader routine is further adapted, to determine that the received vendor identifier matches one of the plurality of identifiers and responsively select one of the at least one of the plurality of programs, to download the selected one of the at least one of the plurality of programs over the communication channel from the host system to the target system, and after failing to find the received vendor identifier at the host system, to download, responsive to the failing to find the received vendor identifier at the host system, one of the at least one of the plurality of programs of a latest version over the communication channel from the host system to the target system.

14. The system of claim 13 wherein the plurality of programs are a plurality of application programs, and wherein the loader routine is an application loader routine adapted to request and receive the vendor identifier from the target system over the communication channel.

15. The system of claim 13 wherein the loader routine is further adapted to employ a plurality of vendor identifiers, associate a vendor identifier and at least one hardware identifier with each of the plurality of programs, determine that the received vendor identifier matches one of the plurality of vendor identifiers, and determine that a received hardware identifier matches the at least one hardware identifier associated with the one of the plurality of vendor identifiers and responsively download the selected one of the at least one of the plurality of programs over the communication channel to the target system.

16. The system of claim 13 wherein the target system includes a first wired communication port adapted to communicate with the communication channel and a second wireless communication port adapted to communicate with the wireless communication vendor.

17. The system of claim 13 wherein the target system is a mobile electronic device.

18. The system of claim 13 wherein the target system is a wireless handheld electronic device.

19. The system of claim 18 wherein the wireless handheld electronic device includes a first wired communication port adapted to communicate with the communication channel and a second wireless communication port adapted to communicate with the wireless communication vendor.

20. The system of claim 19 wherein the selected one of the at least one of the plurality of programs is adapted to enable wireless communication between the second wireless communication port of the wireless handheld electronic device and the wireless communication vendor.

* * * * *